United States Patent
Liu et al.

(10) Patent No.: US 12,302,263 B2
(45) Date of Patent: May 13, 2025

(54) TRANSMISSION OF POWER CONTROL COMMAND

(71) Applicant: Lenovo (Beijing) Ltd., Beijing (CN)

(72) Inventors: Bingchao Liu, Changping District (CN); Chenxi Zhu, Haidian District (CN); Wei Ling, Changping (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 384 days.

(21) Appl. No.: 17/774,634

(22) PCT Filed: Nov. 15, 2019

(86) PCT No.: PCT/CN2019/118654
§ 371 (c)(1),
(2) Date: May 5, 2022

(87) PCT Pub. No.: WO2021/092874
PCT Pub. Date: May 20, 2021

(65) Prior Publication Data
US 2022/0408380 A1    Dec. 22, 2022

(51) Int. Cl.
*H04W 52/58* (2009.01)
*H04W 52/32* (2009.01)
*H04W 52/34* (2009.01)
*H04W 52/14* (2009.01)

(52) U.S. Cl.
CPC ......... *H04W 52/58* (2013.01); *H04W 52/325* (2013.01); *H04W 52/34* (2013.01); *H04W 52/146* (2013.01)

(58) Field of Classification Search
CPC .... H04B 7/024; H04W 52/08; H04W 52/146; H04W 52/325; H04W 52/34; H04W 52/40; H04W 52/58
USPC ..................................................... 455/522, 69
See application file for complete search history.

(56) References Cited

U.S. PATENT DOCUMENTS

| | | | |
|---|---|---|---|
| 9,497,709 B2 * | 11/2016 | Sorrentino | H04W 52/54 |
| 10,771,214 B2 * | 9/2020 | Zhang | H04W 52/242 |
| 2017/0111868 A1 * | 4/2017 | Dahlman | H04W 52/54 |
| 2020/0267706 A1 * | 8/2020 | Babaei | H04W 52/40 |

(Continued)

FOREIGN PATENT DOCUMENTS

| | | |
|---|---|---|
| CN | 108135028 A | 6/2018 |
| CN | 108632971 A | 10/2018 |
| WO | 2019050363 A1 | 3/2019 |

OTHER PUBLICATIONS 19952590.8, "Extended European Search Report", EP Application No. 19952590.8, Jun. 23, 2023, 8 pages.

(Continued)

*Primary Examiner* — Ankur Jain
(74) *Attorney, Agent, or Firm* — FIG. 1 Patents

(57) ABSTRACT

Methods and apparatuses for transmission of power control command are disclosed. In one embodiment, a method at a UE comprises receiving two or more TPC commands for PUCCH resources of the UE in a cell, each PUCCH resource is associated with a higher layer index value configured for a CORESET, determining a TPC command for each PUCCH resource according to the higher layer index value; and transmitting each PUCCH resource using the power according to the determined TPC command.

20 Claims, 6 Drawing Sheets

(56) References Cited

U.S. PATENT DOCUMENTS

| | | | | |
|---|---|---|---|---|
| 2020/0314763 | A1* | 10/2020 | Cheng | H04W 52/146 |
| 2020/0413411 | A1* | 12/2020 | Khoshnevisan | H04L 5/0044 |
| 2021/0029555 | A1* | 1/2021 | Zhou | H04B 7/0665 |
| 2021/0068099 | A1* | 3/2021 | Khoshnevisan | H04W 72/21 |
| 2021/0135830 | A1* | 5/2021 | Yu | H04B 7/06966 |
| 2021/0143964 | A1* | 5/2021 | Frenne | H04L 5/0053 |
| 2022/0248385 | A1* | 8/2022 | Cha | H04W 52/0216 |
| 2022/0256573 | A1* | 8/2022 | Frenne | H04L 1/1812 |
| 2022/0353698 | A1* | 11/2022 | Jang | H04L 1/189 |

OTHER PUBLICATIONS

Samsung, "Enhancements on Multi-TRP/Panel Transmission", 3GPP TSG RAN WG1 Meeting #99, R1-1912482, Reno, NV, USA [retrieved Jul. 7, 2023] Retrieved from the Internet <https://www.3gpp.org/ftp/tsg_ran/WG1_RL1/TSGR1_99/Docs>, Nov. 2019, 13 pages.

"International Search Report and Written Opinion", PCT Application No. PCT/CN2019/118654, Aug. 26, 2020, 6 pages.

Lenovo, et al., "Discussion of multi-TRP/panel transmission", 3GPP TSG RAN WG1 Meeting #99, R1-1912316, Reno, USA [retrieved Jun. 15, 2022]. Retrieved from the Internet <https://portal.3gpp.org/ngppapp/TdocList.aspx?meetingId=32827>, Nov. 2019, 11 pages.

PCT/CN2019/118654, "International Preliminary Report on Patentability", PCT Application No. PCT/CN2019/118654, May 27, 2022, 5 pages.

\* cited by examiner

TRANSMISSION OF POWER CONTROL COMMAND

FIELD

The subject matter disclosed herein generally relates to wireless communications and, more particularly, to methods and apparatuses for transmission of power control command.

BACKGROUND

The following abbreviations are herewith defined, some of which are referred to within the following description: Third Generation Partnership Project (3GPP), Frequency Division Duplex (FDD), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Physical Uplink Shared Channel (PUSCH), Physical Uplink Control Channel (PUCCH), Physical Downlink Control Channel (PDCCH), Sounding Reference Signal (SRS), SRS Resource Indicator (SRI), Downlink Control Information (DCI), Resource Block (RB), Time Division Duplex (TDD), Radio Resource Control (RRC), Media Access Control (MAC), transmit and receive point (TRP), Transmission Power Control (TPC), Multiple-Input Multiple-Output (MIMO), Control Resource Set (CORESET) Radio-Network Temporary Identifier (RNTI), Primary Cell (PCell), Secondary Cell (SCell), Acknowledge (ACK), Negative ACK (HACK).

In NR Rel-15, only transmission from single TRP (transmit and receive point) or panel is supported. DCI with format 2_2 scrambled by TPC-PUCCH-RNTI is used to transmit TPC commands for PUCCH for a group of UEs. In particular, block number 1, block number 2, . . . , block number N are included in the DCI with format 2_2 for N UEs. Each block number can be used by a separate UE to determine its unique TPC command field. Each UE can determine the unique TPC command field based on the higher layer parameter tpc-IndexPCell or tpc-IndexPUCCH-SCell for one cell (PCell or SCell).

For each block, the following fields are defined:

Closed loop indicator: For DCI format 2_2 scrambled by TPC-PUCCH-RNTI, if the UE is not configured with high layer parameter twoPUCCH-PC-AdjustmentStates, this field has 0 bit. Otherwise (i.e. the UE is configured with high layer parameter twoPUCCH-PC-AdjustmentStates), this field has 1 bit;

TPC command: 2 bits. This TPC command only apples to the close loop indicated by the close loop indicator field.

In NR Rel-16, multi-TRP/panel MIMO transmission is supported. Multiple PUCCH resources transmitted to different TRPs within a slot is supported in Rel-16 at least for separate ACK/NACK feedback. As illustrated in FIG. 1, PUCCH resource #0 and PUCCH resource #1 are transmitted within the same slot targeting TRP #0 and TRP #1, respectively. Independent power control including open loop power control and close loop power control for different PUCCH resources targeting different TRPs are necessary to cope with different channel environments. Beam-specific open loop power control for PUCCH is supported in Rel-15 for FR2, and can be straightforward extended to the multi-TRP scenario. However, it is still unknown how to transmit TPC (Transmission Power Control) commands used for close loop power control for different PUCCH resources targeting different TRPs.

BRIEF SUMMARY

It is an object of the present application to propose methods and apparatuses for transmission of power control command.

In one embodiment, a method at a UE comprises receiving two or more TPC commands for PUCCH resources of the UE in a cell, each PUCCH resource is associated with a higher layer index value configured for a CORESET, determining a TPC command for each PUCCH resource according to the higher layer index value; and transmitting each PUCCH resource using the power according to the determined TPC command.

In some embodiment, each TPC command is carried in one DCI with format 2_2 scrambled by TPC-PUCCH-RNTI. In some embodiment, the TPC command carried by a DCI transmitted from a CORESET is determined as the TPC command for the PUCCH resources associated with the same higher layer index value configured for said CORESET. In some other embodiment, the TPC command associated with a close loop index is determined as the TPC command for the PUCCH resources associated with the higher layer index value that is associated with said close loop index.

In another embodiment, all of the TPC commands are carried in a single DCI with format 2_2, in which the same number as the number of different higher layer index values of block number indices are configured for the UE in the cell. In some embodiment, each block having a block number index value contains one TPC command that is determined as the TPC command for the PUCCH resources associated with a higher layer index value associated with the block number index value.

In some embodiment, a method at a base unit comprises transmitting two or more TPC commands for PUCCH resources of a UE in a cell, each PUCCH resource is associated with a higher layer index value configured for a CORESET; and receiving each PUCCH resource transmitted from the UE using the power according to a TPC command determined according to the higher layer index value.

In yet another embodiment, a UE comprises a receiver configured to receive two or more TPC commands for PUCCH resources of the UE in a cell, each PUCCH resource is associated with a higher layer index value configured for a CORESET; a processor configured to determine a TPC command for each PUCCH resource according to the higher layer index value; and a transmitter configured to transmit each PUCCH resource using the power according to the determined TPC command.

In further embodiment, a base unit comprises a transmitter configured to transmit two or more TPC commands for PUCCH resources of a UE in a cell, each PUCCH resource is associated with a higher layer index value configured for a CORESET; and a receiver configured to receive each PUCCH resource transmitted from the UE using the power according to a TPC command determined according to the higher layer index value.

It will be appreciated by persons skilled in the art that the effects that could be achieved with the present disclosure are not limited to what has been particularly described hereinabove and the above and other effects that the present disclosure could achieve will be more clearly understood from the following detailed description.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

Figure 1:
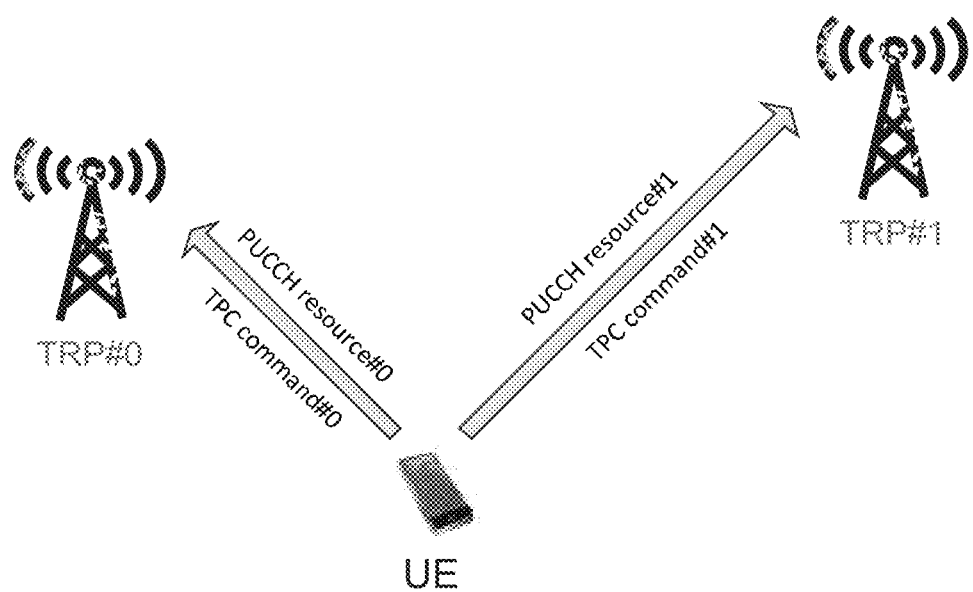
FIG. 1 illustrates PUCCH resources targeting multiple TRPs.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

According to a first embodiment, different TPC commands are carried in DCIs with format 2_2 transmitted from different TRPs, in which each TPC command is carried in a separate DCI. In detail, the TPC command carried by a DCI with format 2_2 only applies to the PUCCH resources associated with the same higher layer index (e.g. CORESETPoolIndex) value as that configured for a CORESET transmitting the DCI.

In particular, PUCCH resources targeting a particular TRP are each associated with a CORESETPoolIndex value. All of the CORESETs configured for the particular TRP are configured with the same CORESETPoolIndex value. Therefore, the TPC command carried in DCI with format 2_2 transmitted in a CORESET (the CORESET is configured with a CORESETPoolIndex value) configured for the particular TRP only applies to a group of PUCCH resources associated with the same CORESETPoolIndex value (each PUCCH resource in the group of PUCCH resources targeting the particular TRP is associated with the same CORESETPoolIndex value). Therefore, all of PUCCH resources targeting a particular TRP can be transmitted using the power according to the TPC command carried in DCI with format 2_2 transmitted in CORESET configured for the particular TRP, since the CORESET transmitting the DCI is configured for the same CORESETPoolIndex value as that associated with the group of PUCCH resources targeting the particular TRP.

Figure 2:
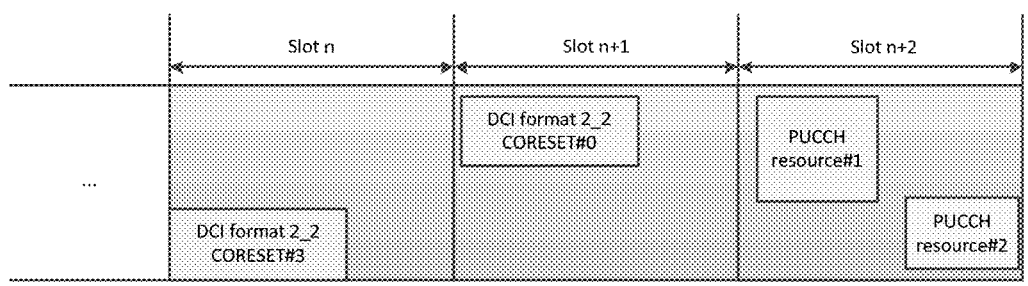
FIG. 2 illustrates transmission of TPC commands according to a first embodiment.

An example of the first embodiment is illustrated in FIG. 2. Two DCIs with format 2_2 each scrambled by a TPC-PUCCH-RNTI are transmitted from CORESET #3 configured for TRP #1 and CORESET #0 configured for TRP #0 in slot n and slot n+1, respectively. CORESET #0 is configured with a higher layer parameter CORESETPoolIndex=0. CORESET #3 is configured with a higher layer parameter CORESETPoolIndex=1. These two DCIs are received by the UE in slot n and slot n+1, respectively.

Two PUCCH resources, i.e. PUCCH resource #1 and PUCCH resource#2, are targeting TRP #0 and TRP #1, respectively, i.e. they are required to be transmitted in slot n+2 to TRP #0 and TRP #1, respectively. PUCCH resource #1 is associated with CORESETPoolIndex=0. PUCCH resource #2 is associated with CORESETPoolIndex=1.

According to the first embodiment, the TPC command carried in DCI with format 2_2 transmitted in CORESET #0 only applies to PUCCH resource #1, since CORESET #0 is configured with higher layer parameter CORESETPoolIndex=0 that is associated with PUCCH resource #1. Similarly, the TPC command carried in DCI with format 2_2 transmitted in CORESET #3 only applies to PUCCH resource #2, since CORESET #3 is configured with higher layer parameter CORESETPoolIndex=1 that is associated with PUCCH resource #2.

Therefore, PUCCH resource #1 is transmitted to TRP #0 using the power according to the TPC command contained in the DCI transmitted in CORESET #0 configured for TRP #0. PUCCH resource #2 is transmitted to TRP #1 using the power according to the TPC command contained in the DCI transmitted in CORESET #3 configured for TRP #1.

FIG. 2 illustrates an example in which PUCCH resources are transmitted to two TRPs. Needless to say, in the condition that PUCCH resources are transmitted to three or more TRPs, the TPC commands for the PUCCH resources targeting each TRP can be carried in the same number (as the number of TRPs) of DCIs each transmitted in a CORESET configured for said TRP.

As can be seen, according to the first embodiment, the TPC command can be carried in DCI with format 2_2 in the same manner as in Rel-15. PUCCH resources targeting one TRP are transmitted using the power according to the TPC command carried in DCI with format 2_2 transmitted in CORESET configured for the one TRP. That is, PUCCH resources targeting each TRP are transmitted using the power according to the TPC command carried in DCI with format 2_2 transmitted in CORESET configured for said each TRP. In this manner, TPC commands for two or more TRPs are supported to be transmitted.

According to the first embodiment, each of the TRPs targeted by PUCCH resources has to transmit DCI with format 2_2 carrying TPC command.

According to a second embodiment, a TRP may transmit DCI with format 2_2 carrying TPC command for PUCCHs targeting another TRP.

Up to two close loops are supported in Rel-15 for PUCCH power control. That is, a close loop indicator field of 1 bit is contained in each block contained in DCI with format 2_2. The close loop indicator has two possible index values, e.g. index=0 and index=1. Each close loop index value is associated with a CORESETPoolIndex value.

According to the second embodiment, each group of PUCCH resources targeting a TRP is associated with a same higher layer index (e.g. CORESETPoolIndex) value and each higher layer index value is associated with a dedicated close loop index value. As a result, PUCCH resources targeting a TRP are associated with dedicated close loop index value. The PUCCH resources associated with the same CORESETPoolIndex value only use a TPC command transmitted for a dedicated close loop index value. PUCCH resources associated with the same CORESETPoolIndex value are also associated with the dedicated close loop index value. As the close loop indicator has two possible index values, the second embodiment can support transmitting TPC commands for PUCCH resources targeting up to 2 TRPs.

For example, the TPC command for the first close loop (i.e. close loop index 0) carried in DCI with format 2_2 only applies to the PUCCH resources associated with a higher layer parameter CORESETPoolIndex with a lower value (e.g. CORESETPoolIndex=0). That is, the lower CORESETPoolIndex value is associated with the TPC command for the first close loop. The TPC command for the second close loop (i.e. close loop index 1) carried in DCI with format 2_2 only applies to the PUCCH resources associated with a higher layer parameter CORESETPoolIndex with a higher value (e.g. CORESETPoolIndex=1). That is, the higher CORESETPoolIndex value is associated with the TPC command for the second close loop.

As can be seen, according to the second embodiment, the TPC command can be carried in DCI with format 2_2 in the same manner as in Rel-15. PUCCH resources targeting one TRP are transmitted using the power according to the TPC command carried in DCI with format 2_2 for the first close loop. PUCCH resources targeting another TRP are transmitted using the power according to the TPC command carried in DCI with format 2_2 for the second close loop. In this manner, TPC commands for up to two TRPs are supported to be transmitted.

According to the first embodiment and the second embodiment, the TPC command can be carried in DCI with format 2_2 in the same manner as in Rel-15. On the other hand, each TPC command is carried in a separate DCI with format 2_2. That is, the same number of DCIs as the number of TRPs (to which PUCCH resources are transmitted) to be targeted have to be transmitted to the UE.

According to a third embodiment, two or more block number indices may be configured for a UE in the DCI with format 2_2. In this manner, two or more TPC commands can be carried in one DCI with format 2_2 for the UE in a cell. This is useful especially for some cases in which DCI with format 2_2 can only be transmitted from one TRP. For example, Common Search Space (CSS) may be only configured for one TRP and but not configured for another TRP. Because DCI with format 2_2 can only be transmitted from the TRP configured with CSS, it cannot be transmitted from the TRP that is not configured with CSS.

Each block contains one TPC command for PUCCH resources targeting one TRP. This can be achieved by configuring each block containing a TPC command with a block number index value associated with a particular higher layer index (e.g. CORESETPoolIndex) value associated with PUCCH resources targeting one TRP. Incidentally, the PUCCH resources associated with the same CORESETPoolIndex value target the same TRP.

For example, a UE may be configured with two block number indices. Therefore, two TPC command fields can be decoded from a DCI with format 2_2 by the UE for a cell. The first decoded TPC command (e.g. contained in the block with number index value=0) only applies to the PUCCH resources associated with the CORESETPoolIndex value=0 (or CORESETPoolIndex with a lower value). The second decoded TPC command (e.g. contained in the block with number index value=1) only applies to the PUCCH resources associated with the CORESETPoolIndex value=1 (or CORESETPoolIndex with a higher value). The higher layer index (e.g. CORESETPoolIndex) value can also be directly configured in PUCCH-TPC-CommandConfig information element for each (TPC command) block number index as the following example:

| PUCCH-TPC-CommandConfig information element |
| --- |
| PUCCH-TPC-CommandConfig ::= SEQUENCE {<br>  tpc-IndexPCell                  INTEGER (1..15) OPTIONAL, -- Cond<br>                                        PDCCH-OfSpcell<br>  associatedCORESETPoolIndex<br>  tpc-IndexPCell-r16              INTEGER (1..15) OPTIONAL, -- Cond<br>                                        PDCCH-OfSpcell<br>  associatedCORESETPoolIndex<br>  tpc-IndexPUCCH-SCell        INTEGER (1..15) OPTIONAL, -- Cond<br>                                        PDCCH-ofSpCellOrPUCCH-<br>Scell<br>...<br>} |

In the above example, each of the block number indices (i.e. tpc-IndexPCell and tpc-IndexPCell-r16) has its associated CORESETPoolIndex value (i.e. associatedCORESET-PoolIndex).

Figure 3:
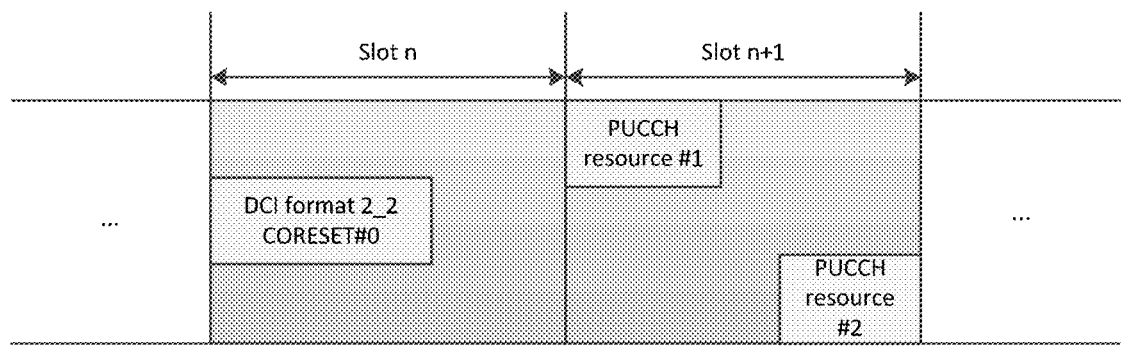
FIG. 3 illustrates transmission of TPC commands according to a third embodiment.

FIG. 3 illustrates an example according to the third embodiment. Two block number indices, e.g. tpc-IndexPCell and tpc-IndexPCell-r16, are configured for the UE in the PCell for M-DCI based M-TRP scenario. The TPC command contained in the block with block number index=tpc-IndexPCell that is associated with CORESET-PoolIndex=0 is used to determine the transmit power for PUCCH resources associated with CORESETPoolIndex=0, while the TPC command contained in the block with block number index=tpc-IndexPCell-r16 that is associated with CORESETPoolIndex=1 is used to determine the transmit power for PUCCH resources associated with CORESET-PoolIndex=1.

The UE receives a DCI with format 2_2 transmitted from a CORESET (e.g. CORESET #0) with two blocks each containing a TPC command for this UE in slot n. Two PUCCH resources, i.e. PUCCH resource #1 associated with CORESETPoolIndex=0 and PUCCH resource #2 associated with CORESETPoolIndex=1, are required to be transmitted in slot n+1. The TPC command contained in the block with block number index value=tpc-IndexPCell associated with CORESETPoolIndex=0 only applies to PUCCH resource #1. The TPC command contained in the block with block number index value=tpc-IndexPCell-r16 associated with CORESETPoolIndex=1 only applies to PUCCH resource #2.

In the example of FIG. 3, in one DCI with format 2_2, two block number indices are configured for the UE to support PUCCH resources targeting two TRPs. A plurality of (e.g. 3 or more) block number indices each associated with a different block number index value can be configured in one DCI with format 2_2 to support PUCCH resources targeting the same number of (3 or more) TRPs.

In addition, the UE may receive more than one DCI with format 2_2 each scrambled by TPC-PUCCH-RNTI in the same slot. In this condition, the UE may have alternative choices on which DCI is valid.

(1) The latest received DCI is valid.

(2) The DCI transmitted from the CORESET configured with the lowest CORESETPoolIndex value is valid.

(3) The first received DCI is valid.

Figure 4:
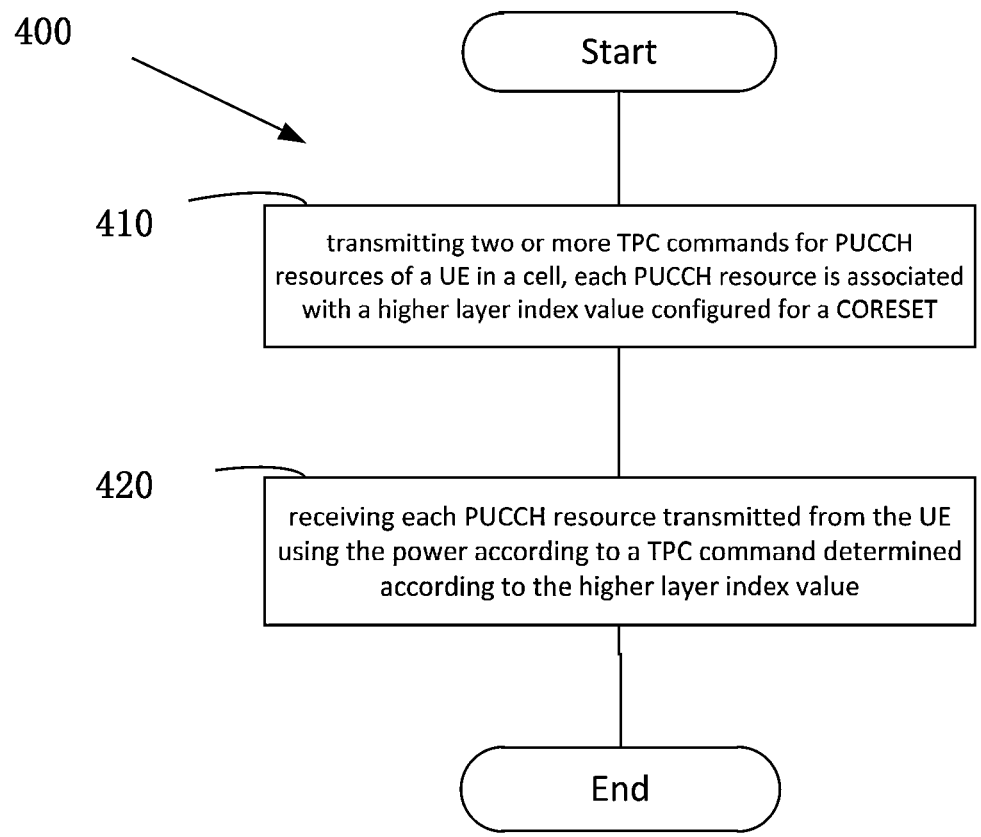
FIG. 4 is a schematic flow chart diagram illustrating an embodiment of a method for transmission of power control command.

FIG. 4 is a schematic flow chart diagram illustrating an embodiment of a method 400 for transmission of power control command. In some embodiments, the method 400 is performed by an apparatus, such as a base unit. In certain embodiments, the method 400 may be performed by a processor executing program code, for example, a microcontroller, a microprocessor, a CPU, a GPU, an auxiliary processing unit, a FPGA, or the like.

The method 400 may include 410 transmitting two or more TPC commands for PUCCH resources of a UE in a cell, each PUCCH resource is associated with a higher layer index value configured for a CORESET, and 420 receiving each PUCCH resource transmitted from the UE using the power according to a TPC command determined according to the higher layer index value.

Figure 5:
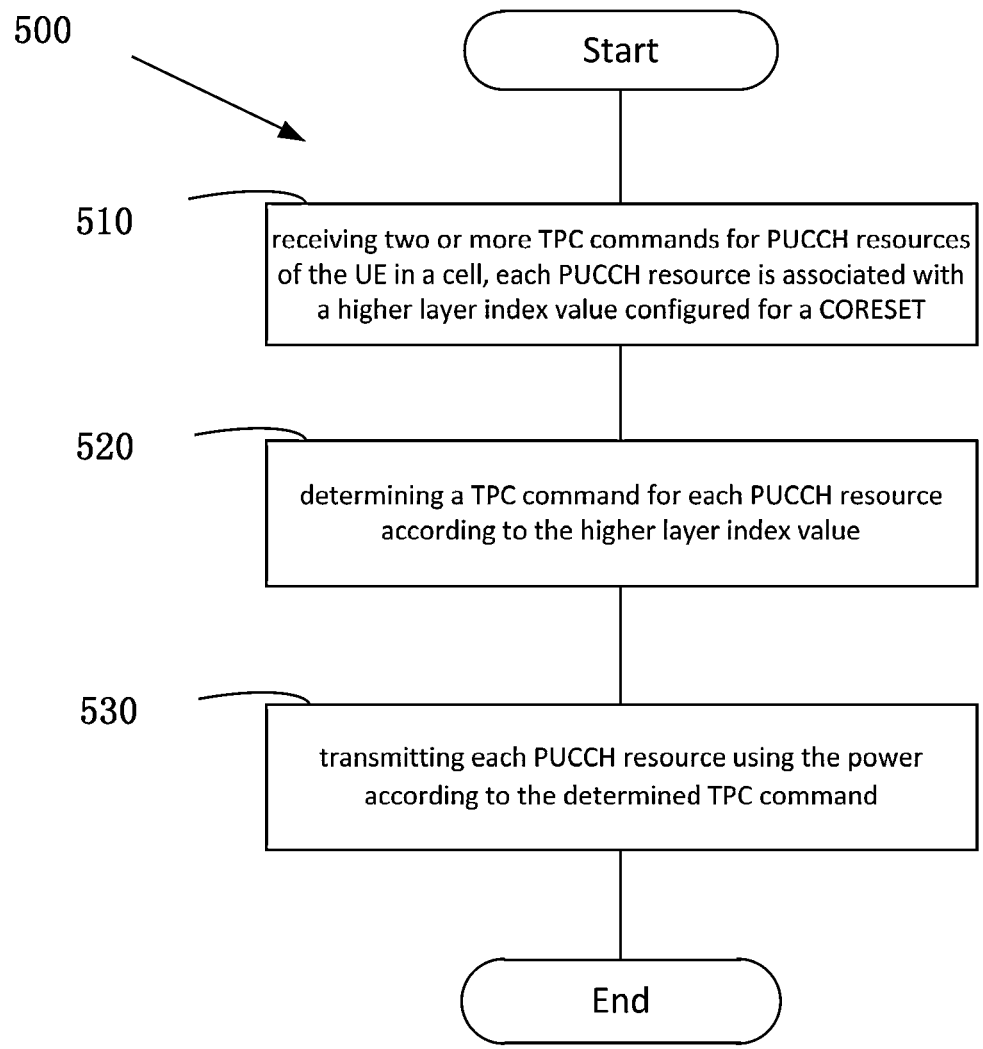
FIG. 5 is a schematic flow chart diagram illustrating a further embodiment of a method for transmission of power control command.

FIG. 5 is a schematic flow chart diagram illustrating a further embodiment of a method 500 for transmission of power control command. In some embodiments, the method 500 is performed by an apparatus, such as a remote unit or a UE. In certain embodiments, the method 500 may be performed by a processor executing program code, for example, a microcontroller, a microprocessor, a CPU, a GPU, an auxiliary processing unit, a FPGA, or the like.

The method 500 may include 510 receiving two or more TPC commands for PUCCH resources of the UE in a cell, each PUCCH resource is associated with a higher layer index value configured for a CORESET; 520 determining a TPC command for each PUCCH resource according to the higher layer index value and 530 transmitting each PUCCH resource using the power according to the determined TPC command.

Figure 6:
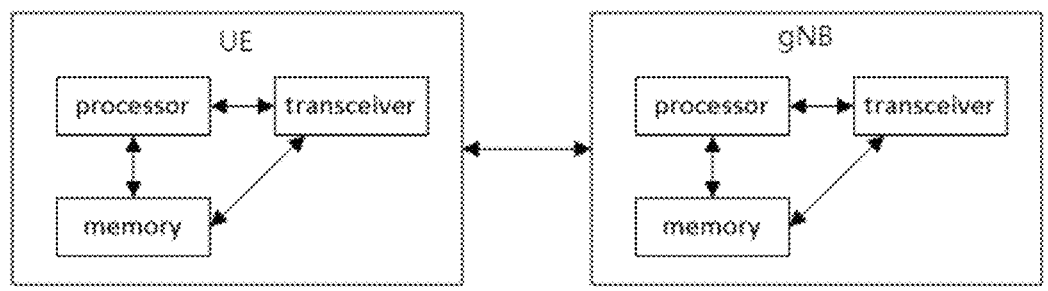
FIG. 6 is a schematic block diagram illustrating apparatuses according to one embodiment.

FIG. 6 is a schematic block diagram illustrating apparatuses according to one embodiment.

Referring to FIG. 6, the UE (i.e. remote unit) includes a processor, a memory, and a transceiver. The processor implements a function, a process, and/or a method which are proposed in FIG. 5. The gNB (i.e. base unit) includes a processor, a memory, and a transceiver. The processors implement a function, a process, and/or a method which are proposed in FIG. 4. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A method at a user equipment (UE), the method comprising:
   receiving two or more transmit power control (TPC) commands for physical uplink control channel (PUCCH) resources of the UE in a cell, wherein each PUCCH resource is associated with a higher layer index value, at least one TPC command is carried by downlink control information (DCI), and the at least one TPC command is determined as a TPC command for PUCCH resources associated with a same higher layer index value;
determining a TPC command for each PUCCH resource according to the higher layer index value; and
transmitting each PUCCH resource using a power according to the determined TPC command.

2. The method of claim 1, wherein, each TPC command is carried in one DCI with format 2_2 scrambled by TPC-PUCCH-RNTI.

3. The method of claim 2, wherein, the TPC command for a close loop index is determined as the TPC command for the PUCCH resources associated with the higher layer index value that is associated with the close loop index.

4. The method of claim 1, wherein the two or more TPC commands are carried in a single DCI with format 2_2, in which a same number as a number of different higher layer index values of block number indices are configured for the UE in a cell.

5. The method of claim 4, wherein each block having a block number index value contains one TPC command that is determined as the TPC command for the PUCCH resources associated with a higher layer index value associated with the block number index value.

6. A user equipment (UE) for wireless communication, comprising:
at least one memory; and
at least one processor coupled with the at least one memory and configured to cause the UE to:
receive two or more transmit power control (TPC) commands for physical uplink control channel (PUCCH) resources of the UE in a cell, wherein each PUCCH resource is associated with a higher layer index value, at least one TPC command is carried by downlink control information (DCI), and the at least one TPC command is determined as a TPC command for PUCCH resources associated with a same higher layer index value;
determine a TPC command for each PUCCH resource according to the higher layer index value; and
transmit each PUCCH resource using a power according to the determined TPC command.

7. The UE of claim 6, wherein, each TPC command is carried in one DCI with format 2_2 scrambled by TPC-PUCCH-RNTI.

8. The UE of claim 7, wherein, the TPC command for a close loop index is determined as the TPC command for the PUCCH resources associated with the higher layer index value that is associated with the close loop index.

9. The UE of claim 6, wherein the two or more TPC commands are carried in a single DCI with format 2_2, in which a same number as a number of different higher layer index values of block number indices are configured for the UE in a cell.

10. The UE of claim 9, wherein each block having a block number index value contains one TPC command that is determined as the TPC command for the PUCCH resources associated with a higher layer index value associated with the block number index value.

11. A base unit for wireless communication, comprising:
at least one memory; and
at least one processor coupled with the at least one memory and configured to cause the base unit to:
transmit two or more transmit power control (TPC) commands for physical uplink control channel (PUCCH) resources of a user equipment (UE) in a cell, wherein each PUCCH resource is associated with a higher layer index value, at least one TPC command is carried by downlink control information (DCI), and the at least one TPC command is determined as a TPC command for PUCCH resources associated with a same higher layer index value; and
receive each PUCCH resource transmitted from the UE using a power according to a TPC command determined according to the higher layer index value.

12. The base unit of claim 11, wherein, each TPC command is carried in one DCI with format 2_2 scrambled by TPC-PUCCH-RNTI.

13. The base unit of claim 12, wherein, the TPC command for a close loop index is determined as the TPC command for the PUCCH resources associated with the higher layer index value that is associated with the close loop index.

14. The base unit of claim 11, wherein the two or more TPC commands are carried in a single DCI with format 2_2, in which a same number as a number of different higher layer index values of block number indices are configured for the UE in the cell.

15. The base unit of claim 14, wherein each block having a block number index value contains one TPC command that is determined as the TPC command for the PUCCH resources associated with a higher layer index value associated with the block number index value.

16. A processor for wireless communication, comprising:
at least one controller coupled with at least one memory and configured to cause the processor to:
receive two or more transmit power control (TPC) commands for physical uplink control channel (PUCCH) resources of a user equipment (UE) in a cell, wherein each PUCCH resource is associated with a higher layer index value, at least one TPC command is carried by downlink control information (DCI), and the at least one TPC command is determined as a TPC command for PUCCH resources associated with a same higher layer index value;
determine a TPC command for each PUCCH resource according to the higher layer index value; and
transmit each PUCCH resource using a power according to the determined TPC command.

17. The processor of claim 16, wherein, each TPC command is carried in one DCI with format 2_2 scrambled by TPC-PUCCH-RNTI.

18. The processor of claim 17, wherein, the TPC command for a close loop index is determined as the TPC command for the PUCCH resources associated with the higher layer index value that is associated with the close loop index.

19. The processor of claim 16, wherein the two or more TPC commands are carried in a single DCI with format 2_2, in which a same number as a number of different higher layer index values of block number indices are configured for the UE in a cell.

20. The processor of claim 19, wherein each block having a block number index value contains one TPC command that is determined as the TPC command for the PUCCH resources associated with a higher layer index value associated with the block number index value.

* * * * *